Figure 1:
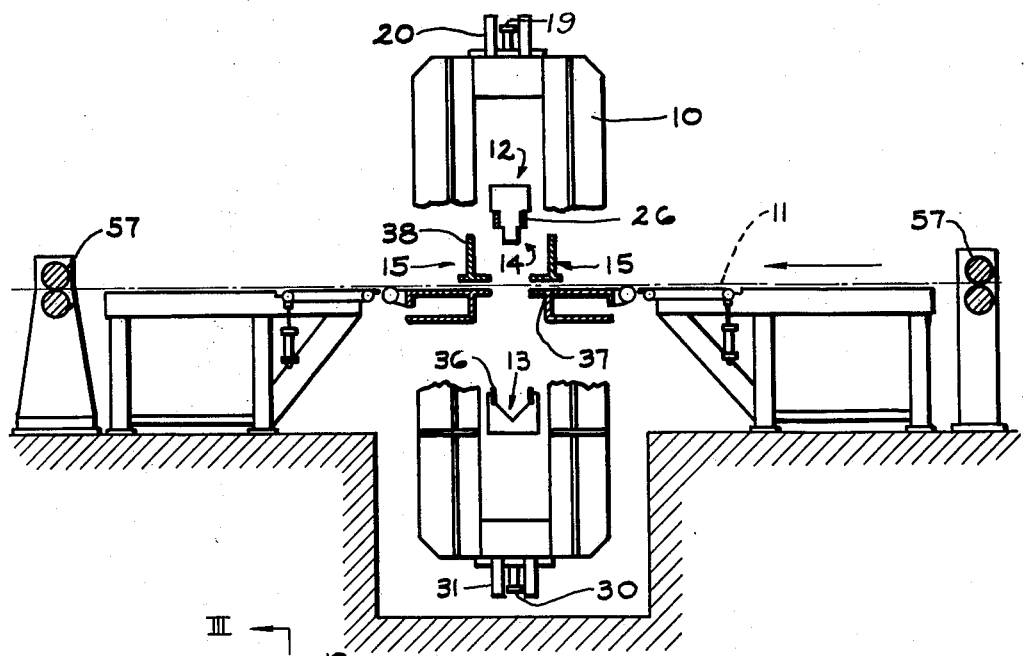

Oct. 31, 1961     J. H. COOPER     3,007,031
STRIP WELDING APPARATUS

Filed Aug. 27, 1957     2 Sheets-Sheet 1

INVENTOR
JOSEPH H. COOPER
BY *Francis J. Klempay*
ATTORNEY

Oct. 31, 1961  J. H. COOPER  3,007,031
STRIP WELDING APPARATUS
Filed Aug. 27, 1957  2 Sheets-Sheet 2

INVENTOR
JOSEPH H. COOPER

BY Francis J. Klempay
ATTORNEY 3,007,031
STRIP WELDING APPARATUS
Joseph H. Cooper, Warren, Ohio, assignor to The Taylor-Winfield Corporation, Warren, Ohio, a corporation of Ohio
Filed Aug. 27, 1957, Ser. No. 680,584
8 Claims. (Cl. 219—125)

The present invention relates to welding apparatus and more particularly to that type of welding apparatus adapted for use in joining the leading and trailing ends of strip sections in a substantially automatic manner. Such apparatus is known in the art as strip welding apparatus.

As will be appreciated by those skilled in the art, successful completion of strip welding in a fast and efficient manner is predicated upon the accurate gauging, shearing and positioning of the ends of the strip sections prior to welding. Such welding apparatus is usually employed in continuous process lines, such as electro-tinning lines, for example, and due to advances made in the strip processing arts it is necessary that the strip sections be joined in a minimum of time since this not only reduces the amount of strip storage equipment required but also allows the process line to be operated at its maximum rate. In my prior and co-pending patent application, Serial No. 616,151, entitled "Narrow Lap Seam Welder," filed October 6, 1956, now U.S. Patent No. 2,911,515 and assigned to the assignee of the present application, there is shown and described a seam welder which has been found well suited for the joining of strip sections in continuous process lines and other like uses where fast and efficient welding operations are required.

The strip welding apparatus shown in the above mentioned application embodies welding means of the electric resistance type including a pair of opposed current conductive roller electrodes adapted to engage and be moved across opposite faces of the properly positioned ends of the strip sections. However, in the welding of some materials it is preferred to use other types of welding means, such as arc welding or submerged arc welding means, for example, in order to obtain a completely acceptable weld. It is therefore the primary or ultimate object of the present invention to provide strip welding apparatus of the type and general character disclosed in my above mentioned prior application embodying arc welding means for completing the actual joining of the ends of the strip sections.

It is yet another object of the present invention to provide strip welding apparatus embodying arc welding means which is characterized by the advantages and efficiencies of the apparatus disclosed in my above mentioned application. It should be understood that in the welding of the ends of strip sections that extremely accurate positioning of the strip sections is required prior to the welding thereof. The strip sections must initially be gauged, sheared, clamped and then moved into proper position if the welding operation is to produce welds of acceptable and desired quality. This is particularly true when welding extremely wide strip sections. Thus, the strip welding apparatus of the present invention includes means similar to that disclosed in my prior application for properly gauging, shearing, clamping and positioning the strip sections.

Yet another object of the present invention is to provide strip welding apparatus of the type embodying arc welding means which includes improved means for supporting and guiding the weld back-up plate which not only serves to back-up the strip sections during welding but also serves to help clamp the strips in proper position.

A further object of the invention is to provide welding apparatus including an improved construction of retractable weld back-up plate. As will be hereinafter more fully explained, the weld back-up plate must be retractable to allow gauging, shearing and positioning of the ends of the strip sections but yet must be accurately and correctly positioned in operating position to allow the completion of acceptable welds. In a preferred embodiment of the invention the weld back-up plate is guided for transverse movement by the lower shear carrier which in turn is vertically movable and operative to raise the extended back-up plate into welding position.

A more specific object of the invention is to provide strip welding apparatus embodying arc welding means which is characterized by its utmost simplicity in construction and operation. As will be hereinafter more fully apparent, the apparatus includes many component assemblies of the same general type and construction disclosed in my previously mentioned patent application.

These, as well as other objects and advantages of the invention, will become more fully apparent upon consideration of the following specification and accompanying drawing wherein there is described and shown a certain preferred embodiment of the invention.

Figure 2:
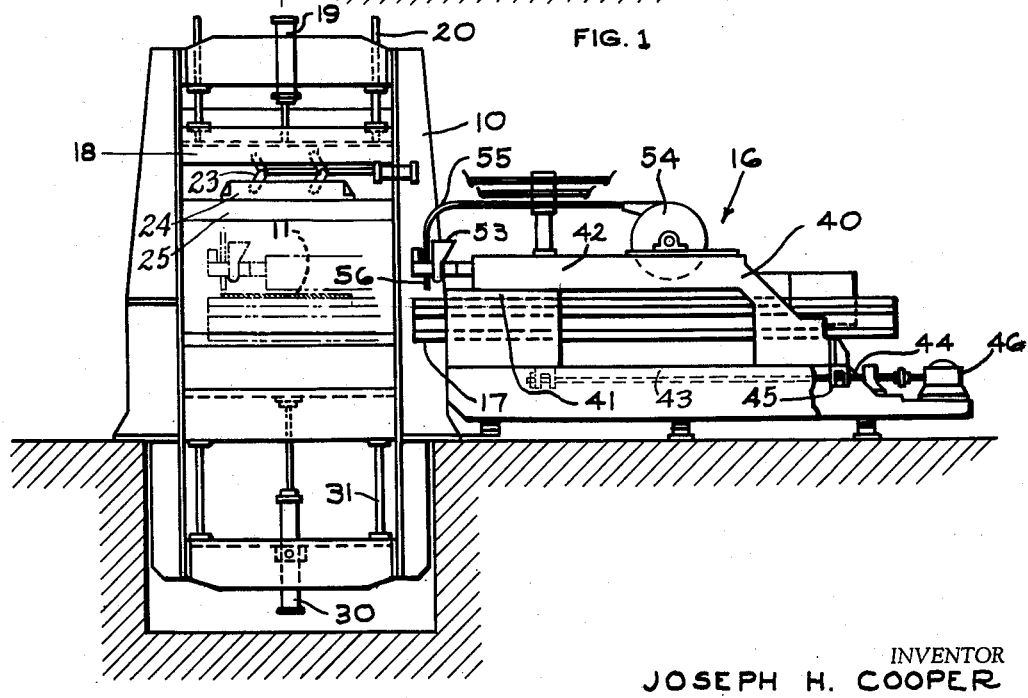
Figure 3:
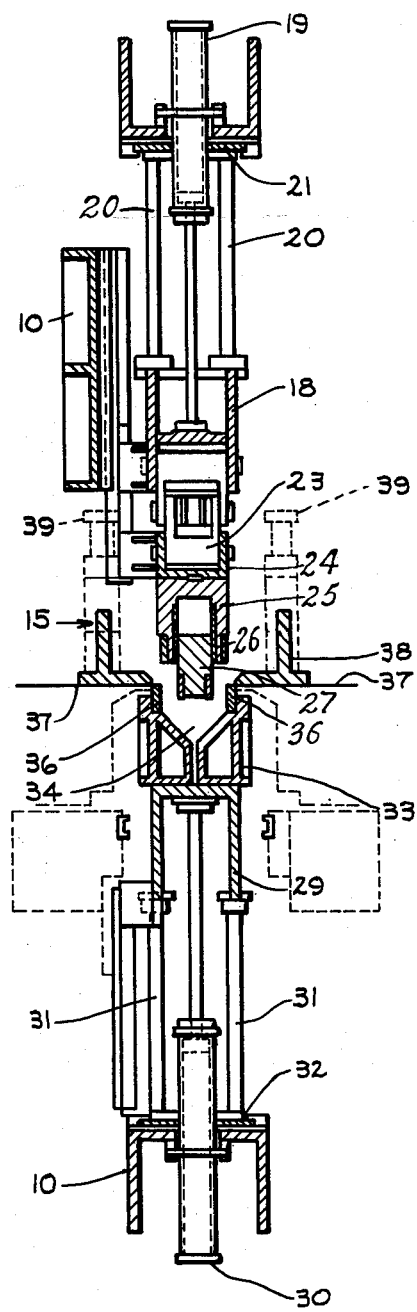
Figure 4:
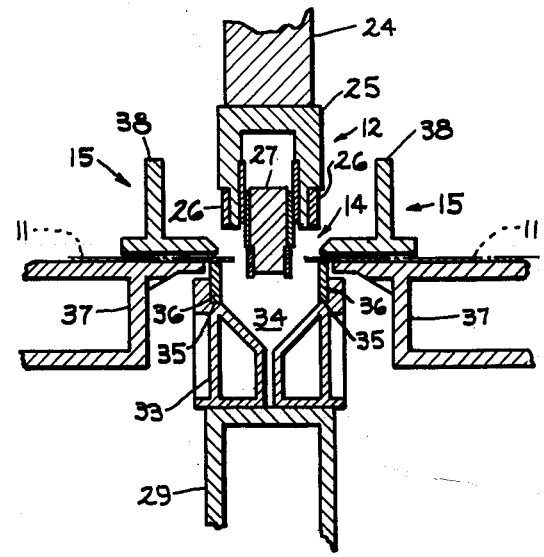
Figure 5:
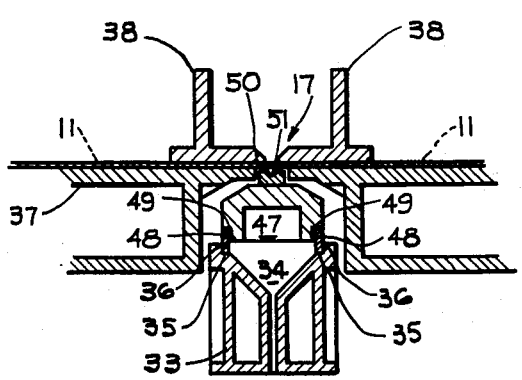

In the drawing:
FIGURE 1 is a fragmentary side sectional view of strip welding apparatus embodying arc welding means constructed in accordance with the teachings of the present invention;
FIGURE 2 is an end view of the apparatus shown in FIGURE 1 showing specifically the transversely movable arc welding apparatus;
FIGURE 3 is a detailed side sectional view taken along the section line III—III of FIGURE 2;
FIGURE 4 is an enlarged fragmentary side view showing the positioning of the component assemblies prior to shearing; and
FIGURE 5 is an enlarged fragmentary side view showing the positioning of the component assemblies prior to welding.

Referring now to the drawing, and initially to FIGURES 1–3 thereof, the welding apparatus comprises a large housing 10 having an opening therein and spanning the pass line of the strip, indicated by a broken line 11 with the normal direction of strip travel being designated by an arrow. The housing 10 mounts vertically movable upper and lower cooperating shear means 12 and 13, respectively, and gauging means 14. The welding apparatus also includes clamping and positioning means 15 mounted on opposite sides of the weld line of the strip sections and a movable welding assembly 16 mounting welding means and a weld back-up plate 17 adapted to complete the weld between the ends of properly positioned strip sections. The structure of these various component assemblies will be hereinafter more fully explained.

The upper shear means 12 comprises a shear carriage 18 which transversely spans the pass line of the strip sections and is guided for vertical movement in the housing 10. Vertical movement of the shear carriage 18 is accomplished by appropriate actuation of a fluid cylinder 19 mounted on the top of the housing 10 and having its piston rod connected with shear carriage 18. The shear carriage 18 also mounts a plurality of upwardly extending rods 20 adapted to pass through apertures, not specifically shown, in the top of the housing 10 when the upper shear carriage is retracted. A movable locking plate 21 is employed to block these last mentioned apertures when the shear carriage is in extended position during shearing operations to relieve the fluid cylinder 19 from shock forces during shearing of the strip ends.

Mounted in downwardly depending relation from the upper shear carriage 18 by means of parallel toggle linkages 23 is a generally U-shaped member 24 which has keyed thereto a downwardly extending upper shear carrier 25 mounting a pair of parallel and transversely spaced shear blades 26. Means, preferably a fluid cylinder and an operating link mounted from the upper shear carriage 18 as shown in my above identified co-pending patent application, are employed for actuating the toggle linkages 23 in such a manner that the U-shaped member 24 and the upper shear carrier 25, as well as the shear blades 26 carried thereby, are movable in a vertical direction relatively independently of the movement of the upper shear carriage 18.

As will be observed in FIGURE 3 of the drawing, the upper shear carrier 25 is of generally U-shaped cross section and received in nesting relation within the center opening defined by the U-shaped upper shear carrier 25 is a gauge bar 27 whose opposite faces serve as abutment gauging faces for the leading and trailing ends of the strip sections. The gauge bar 27 is mounted for relatively independent vertical movement by a pair of fluid cylinders, not specifically shown, mounted on opposite ends of the U-shaped member 24 with their piston rods connected to the gauge bar 27 in the manner disclosed in my related co-pending patent application.

The arrangement of the upper shear means 12 is such that the shear carriage 18 is first lowered to its down position and the gauge bar is lowered for gauging. After gauging the gauge bar 27 is retracted in nesting relation within the shear carrier 25 and the linkages 23 are actuated to move the shear carrier 25 and the shear blades 26 through a shearing stroke to crop the ends of the strip sections. During shearing operations the locking plate 21 covers the apertures in the housing 10 so that the lifting cylinder 19 is relieved of any possible shock forces.

The lower shear means 13 comprises a generally U-shaped shear carriage 29 which is mounted for vertical movement in the housing 10 in spanning relation with respect to the pass line of the strip by a lifting cylinder 30 in the manner shown. A plurality of vertically extending rods 31 and a locking plate 32 are employed to relieve the lifting cylinder from shock shearing forces in the same manner as utilized in the upper shear means 12. The lower shear carriage 29 mounts on the top face thereof a lower shear carrier 33 which is formed with a generally triangular opening 34 therein so as not to interfere with gauging operations when the lower shear means and the gauge bar 27 are both in the extended position. The lower shear carrier 33 is formed with channels 35 near the top edges thereof which serve as mounting seats for transversely spaced lower shear blades 36. It will be noted that the lower shear blades 36 extend above the top edges of the lower shear carrier and are spaced a greater distance than the upper shear blades 26 whereby these upper and lower shear blades are adapted to cooperate in cropping the ends of the strip sections preparatory to the welding operation.

In any type of strip welding apparatus it is necessary to provide means for positively and accurately clamping the ends of the strip sections. In the present invention this is accomplished by the two clamping means 15, one being mounted on each side of the weld line and to avoid unnecessary repetition in the specification only one of these means will be described in detail. Each of the clamping means 15 comprises a clamping platen 37 which serves as a support for the strip section and a clamping member 38 disposed above the pass line of the strip adapted to cooperate with the platen 37 to clamp the strip section. Both the platen 37 and the clamping member 38 extend transversely across the path of strip travel and a cylinder 39 is mounted at each end of the platen 37 with its piston rod connected with the clamping member 38 to move the same into and out of clamping relation with respect to the platen. The clamping means 15 also embodies means for shifting the same longitudinally a predetermined distance toward the weld line of the apparatus. This may be accomplished as shown in my above mentioned patent application by mounting the platen 37 and the clamping member 38 on slides and providing a fluid cylinder for moving these members. Also, the clamping means may include means for transversely shifting the clamped strip section as well as means to raise the end of the strip section above the normal pass line of the strip as shown in my co-pending patent application. Some type of limiting means, such as adjustable abutment stops, should be employed to accurately limit the inward movement of the clamp means to allow accurate control over the final positioning of the strip sections.

In operation of the clamping means 15 the end of a strip section is moved adjacent the weld line and against the abutment surface of the gauge bar 27 to properly gauge the strip. Then the clamping cylinder 39 is actuated to lower the clamping member 38 into clamping relation with respect to the platen 37 to firmly clamp the strip section. Next the shearing means is actuated to crop the end of the strip section while the same is still clamped and then the clamp means 15 is moved longitudinally a predetermined and adjustable distance whereby the strip section is properly positioned for welding. As previously indicated, there are two clamping means 15, one on each side of the weld line, and the operation and construction of each of these means is identical. Thus, each of the clamping means 15 is operative to clamp a strip section after gauging and during shearing, positioning and welding. After shearing both of the strip sections are moved longitudinally toward each other so that the strip sections are properly positioned and the clamping means 15 may be moved transversely with respect to each other to cross-align the strip sections preparatory to welding.

The actual joining of the strip sections is accomplished by the movable welding assembly 16 which comprises a housing 40 mounted to one side of the housing 10 and adapted to be moved within the opening therein. The housing 40 has a generally U-shaped opening 41 at the forward end thereof defining upper and lower arms 42 and 43, respectively, which are adapted to extend over the properly positioned strip sections during welding operations. The housing 40 is mounted on suitable supports for transverse movement and this movement is accomplished by a threaded shaft 44 which cooperates with and drives a threaded collar 45 which is attached to the housing 40. The threaded shaft 44 is driven from suitable powering means, not specifically shown, such as an electric motor, for example, through suitable gearing contained in speed reducer 46.

Mounted on the upper surface of the lower arm 43 of the housing 40 is the weld back-up plate 17 which as shown in FIGURE 5 of the drawing comprises a back-up bar carrier 47 of generally rectangular cross section having angular downwardly opening recesses 48 at the lower corners thereof which are lined with wear resistant plates 49. The wear plates 49 and the recesses 48 form, in effect, slides which are adapted to be slidably received on the lower shear blades 36 in a manner and for a purpose which will be hereinafter more fully explained. Mounted on the top surface of back-up bar carrier 47 is a weld back-up bar 50 which is rectangular in cross section and has an arcuate depression 51 on the upper surface thereof which extends throughout its length. The weld back-up plate assembly 17 is movable transversely independently on the housing 40 into a position below the pass line of the strip by powering means, not shown, such as a fluid cylinder or a suitable drive motor, for a purpose which will be hereinafter more fully explained.

The upper arm 42 of the housing 10 serves as a support for the actual welding assembly which may be of any number of automatically operated types and includes a welding torch 53 and, in some types, a reel-type wire feeder 54. An electrode 55 is fed via suitable supporting and guiding equipment and a tubular guide 56 which is movable in a plurality of directions to allow adjustment of the welding operation. The welding assembly in itself is of conventional construction and may be of a type best adapted for completing a weld of the material being joined in a fast and expedient manner. As an example, the welding assembly may be of the shielded arc type wherein a protective atmosphere of inert gas surrounds the welding area to protect the weld from the oxidizing effects of the atmosphere. The utilization of the apparatus above described will perhaps best be understood when considering the operation of the strip welder as set forth below.

It is assumed that initially all the component parts of the strip welding apparatus are in retracted position. To initiate the joining of strip sections the leading and trailing ends thereof are moved by suitable pinch rolls 57 (see FIGURE 1) to opposite sides of the weld line. The upper shear carriage 18 and the gauge bar 27 are moved into their extended positions with the gauge bar positioned between the ends of the strip sections and blocking the pass line of the strip. At the same time the lower shear carriage 29 is moved into a position directly below the weld line of the strip. The arrangement of the above described component parts of the apparatus at this time is depicted in FIGURE 4 of the drawing.

The strips are now moved into abutting relation with the opposite abutment surfaces of the gauge bar 27 and the clamping members 38 are lowered to positively clamp the strip sections. Then the gauge bar 27 is retracted and the toggle linkages 23 are actuated to move the upper shear blades 26 through a shearing stroke to crop the ends of the strip sections. Then the upper shear means 12 is moved to its retracted position to open the window in the housing 10 for reception of the welding assembly 16. It will be noted that the strip sections are clamped during shearing operations and are not released until welding operations are completed so that accurate control over the positioning, etc. of the strip sections is afforded. As the upper shear means 12 is retracted the lower shear means 13 is lowered a predetermined distance (not fully retracted) with the lower shear blades 36 positioned slightly below the pass line of the strip. With the apparatus so arranged the clamping means 15 are moved toward each other to properly position the ends of the strip sections for welding and the weld back-up carrier 47 mounting the weld back-up bar 50 are moved transversely with the angled wear plates 49 acting as slides being received on the spaced lower shear blades 36 which act as ways. The weld back-up bar carrier and the weld back-up bar 50 are moved to a position directly under the weld line with the arcuate depression 51 aligned in coextensive relation with the weld line of the strip sections. The arrangement of parts at this particular time in the operational cycle of the strip welding apparatus is shown in FIGURE 5 of the drawing. It will be noted that the back-up bar carrier 47 and weld back-up bar 50 are movable transversely and independently of the welding assembly 16 and that the welding assembly 16 is disposed to one side of the pass line of the strip at this time.

The next operation is to move the lower shear carriage 29 upwardly upon proper actuation of the lifting cylinder 30 associated therewith to forcibly clamp the weld back-up bar 50 in proper position with respect to the strip sections preparatory to welding. Then the welding assembly 16 is actuated and the housing 40 is driven to carry the welding assembly 16 across the weld line and the ends of the strip sections to complete the welding operation.

After the welding operation is completed the lower shear carrier is retracted and the weld back-up bar carrier 47 and weld back-up bar 50 are removed to their initial positions. The welding assembly 16 and housing 40 are also retracted and the clamping means 15 are released so that the welded strip sections are released and may be moved through the apparatus.

It will be appreciated by those skilled in the art that the welding apparatus of the present invention may include automatic electrical and mechanical control instrumentalities for effecting automatic operation of the apparatus. Limit switches, relays, etc. and other like component parts may be arranged in a conventional manner to effect automatic operation of the apparatus.

At the heart of the present invention is the inventive concept of providing means for guiding a weld back-up plate in a strip welder of the type disclosed. In the present embodiment this is accomplished by using the lower shear blades as ways for guiding the back-up plate into position. However, in some installations it may be desirable to mount separate ways on other parts of the apparatus below the pass line of the strip and making the weld back-up bar self-expanding to properly position the same.

It should thus be apparent that I have accomplished the objects initially set forth by providing improved strip welding apparatus. Although I have shown and described a preferred embodiment of the invention, it will be understood that many changes may be made therein without departing from the teachings of the invention. Reference should therefore be had to the following appended claims in determining the true scope of the invention.

I claim:

1. In a welder wherein the adjacent ends of strips to be welded are positioned and traversed by welding means; the combination comprising shearing means, said shearing means comprising a carriage member mounting a pair of spaced shear blades, means to vertically move said carriage member, said welding means comprising a weld back-up plate, means to move said weld back-up plate transversely into and from a position adjacent said ends of strips to be welded, said weld back-up plate having ways therein, and said shear blades defining guides for slidably receiving and supporting said weld back-up plate upon actuation of said means for transversely moving said weld back-up plate.

2. Apparatus according to claim 1 further characterized in that said weld back-up plate comprises a weld back-up bar carriage, said weld back-up bar carriage having a pair of angular depressions on two opposite corners thereof, a plurality of wear plates lining said angular depressions, a generally rectangular weld back-up bar mounted on said weld back-up bar carriage, and said wear plates defining said ways adapted to be slidably received on said shear blades.

3. In a welder wherein the adjacent ends of strips to be welded are traversed by welding means; the combination of a housing having an opening therein adapted to receive said adjacent ends of strips and said welding means, a weld back-up plate adapted for transverse movement into and out of said housing, a plurality of ways in said weld back-up plate, a plurality of slides mounted within said housing to one side of the pass line of said strip, said slides and said ways cooperating in guiding and positioning said weld back-up plate, means for moving said weld back-up plate from a position laterally offset from said housing to a position within said opening, and said plurality of slides comprising a plurality of spaced shear blades.

4. In a welder wherein the adjacent ends of strips to be welded are traversed by welding means; the combination of a housing having an opening therein adapted to receive said adjacent ends of strips and said welding means, a weld back-up plate adapted for transverse movement into and out of said housing, a plurality of ways in said weld back-up plate, a plurality of slides mounted within said housing to one side of the pass line of said strip, said slides and said ways cooperating in guiding and positioning said weld back-up plate, means for moving said weld back-up plate from a position laterally offset from said housing to a position within said opening, and said welder further comprising means for raising and lowering said slides when said weld back-up plate is received thereon for forcibly moving said weld back-up plate into proper position with respect to said adjacent ends of strips.

5. A strip welder for welding the adjacent ends of strips comprising welding means, weld back-up means adapted for transverse movement into and out of the normal path of travel of said strips, means for moving said weld back-up means from a position laterally offset from said normal path of travel of said strips to a position within the projected vertical plane of said normal path of travel of said strips, means for guiding and supporting said weld back-up means during transverse movement into and out of said normal path of travel of said strips, a plurality of longitudinally spaced shear blades extending transversely across said normal path of travel of said strips, means to vertically move said shear blades, and said shear blades comprising said means for guiding and supporting said weld back-up means.

6. A strip welder for welding the adjacent ends of strips comprising welding means, weld back-up means adapted for transverse movement into and out of the normal path of travel of said strips, means for moving said weld back-up means from a position laterally offset from said normal path of travel of said strips to a position within the projected vertical plane of said normal path of travel of said strips, means for guiding and supporting said weld back-up means during transverse movement into and out of said normal path of travel of said strips, a weld carriage mounted to one side of said normal path of travel of said strips, means for transversely moving said weld carriage into and out of said normal path of travel of said strips, said welding means being mounted on said weld carriage, said weld back-up means being mounted on said weld carriage, and said means for moving weld back-up means being mounted on said weld carriage whereby said weld back-up plate is movable transversely independently of said welding means.

7. In a welder wherein the adjacent ends of strips to be welded are traversed by welding means; the combination of a housing adapted to receive said adjacent ends of strips and said welding means, a weld back-up plate adapted for transverse movement into and out of said housing, means for moving said weld back-up plate from a position laterally offset from said housing to a position within said housing, means for guiding and supporting said weld back-up plate during transverse movement into and out of said housing, means to vertically move said means for guiding and supporting said weld back-up plate to move the same vertically into proper clamping engagement with said adjacent ends of strips after said weld back-up plate has been moved into said housing, a vertically movable shear means received in said housing, and said shear means comprising said means for guiding and supporting said means to vertically move said weld back-up plate.

8. In a welder wherein the adjacent ends of strips to be welded are traversed by welding means; the combination of a housing adapted to receive said adjacent ends of strips and said welding means, a weld back-up plate adapted for transverse movement into and out of said housing, means for moving said weld back-up plate from a position laterally offset from said housing to a position within said housing, means for guiding and supporting said weld back-up plate during transverse movement into and out of said housing, means to vertically move said means for guiding and supporting said weld back-up plate to move the same vertically into proper clamping engagement with said adjacent ends of strips after said weld back-up plate has been moved into said housing, a shear carriage, means to raise and lower said shear carriage, said shear carriage mounting a pair of spaced and projecting shear blades, said weld back-up plate having a pair of ways therein adapted to be slidably received on said shear blades and defining said means for guiding and supporting, and said shear carrier comprising said means to vertically move said weld back-up plate.

References Cited in the file of this patent

UNITED STATES PATENTS

| | | |
|---|---|---|
| 1,226,639 | Cary | May 22, 1917 |
| 2,078,365 | Biggert et al. | Apr. 27, 1937 |
| 2,369,830 | Johnson et al. | Feb. 20, 1945 |
| 2,412,648 | Rendel | Dec. 17, 1946 |
| 2,641,673 | Dahl | June 9, 1953 |
| 2,663,784 | Iverson | Dec. 22, 1953 |
| 2,685,629 | Peck | Aug. 3, 1954 |
| 2,794,112 | Crow | May 28, 1957 |
| 2,866,077 | Morton et al. | Dec. 23, 1958 |
| 2,874,266 | Klempay | Feb. 17, 1959 |